(12) United States Patent
Kim et al.

(10) Patent No.: US 11,286,580 B2
(45) Date of Patent: Mar. 29, 2022

(54) METHOD FOR PRODUCING ACRYLONITRILE-BASED FIBER

(71) Applicant: LG CHEM, LTD., Seoul (KR)

(72) Inventors: Sang Jin Kim, Daejeon (KR); Chang Hong Bak, Daejeon (KR); Hye Jin Han, Daejeon (KR); Ki Yeon Jo, Daejeon (KR); Jeong Hun Cho, Daejeon (KR); Joon Hee Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 288 days.

(21) Appl. No.: 16/491,476

(22) PCT Filed: Sep. 27, 2018

(86) PCT No.: PCT/KR2018/011440
§ 371 (c)(1),
(2) Date: Sep. 5, 2019

(87) PCT Pub. No.: WO2019/066500
PCT Pub. Date: Apr. 4, 2019

(65) Prior Publication Data
US 2020/0190701 A1 Jun. 18, 2020

(30) Foreign Application Priority Data

Sep. 29, 2017 (KR) .................. 10-2017-0127618

(51) Int. Cl.
| | | |
|---|---|---|
| *D01D 1/02* | (2006.01) | |
| *D01D 10/02* | (2006.01) | |
| *D01D 10/06* | (2006.01) | |
| *D01F 1/10* | (2006.01) | |
| *C01B 32/05* | (2017.01) | |
| *C08F 222/30* | (2006.01) | |
| *C08J 5/00* | (2006.01) | |
| *D01D 5/06* | (2006.01) | |
| *D01F 6/18* | (2006.01) | |
| *D01F 9/22* | (2006.01) | |
| *D01D 5/04* | (2006.01) | |
| *D01F 6/38* | (2006.01) | |

(52) U.S. Cl.
CPC .............. *D01F 1/10* (2013.01); *C01B 32/05* (2017.08); *C08F 222/30* (2013.01); *C08J 5/00* (2013.01); *D01D 5/06* (2013.01); *D01F 6/18* (2013.01); *D01F 9/22* (2013.01); *C08J 2333/20* (2013.01); *D01D 5/04* (2013.01); *D01F 6/38* (2013.01); *D01F 9/225* (2013.01); *D10B 2321/10* (2013.01)

(58) Field of Classification Search
CPC .. D01D 1/02; D01D 5/04; D01D 5/06; D01D 10/02; D01D 10/06; D10B 2321/10; D01F 6/38; D01F 9/22; D01F 9/225

USPC ....... 264/29.2, 29.6, 178 F, 182, 206, 210.8, 264/211.14, 211.15, 211.16, 233, 331.19; 423/447.6, 447.7
See application file for complete search history.

(56) References Cited

U.S. PATENT DOCUMENTS

| | | | |
|---|---|---|---|
| 8,372,323 B2 | 2/2013 | Wilkinson | |
| 2006/0134413 A1* | 6/2006 | Wilkinson | ............... D01F 6/38 |
| | | | 428/364 |
| 2011/0059314 A1 | 3/2011 | Wilkinson | |
| 2011/0160369 A1 | 6/2011 | Way et al. | |
| 2013/0281650 A1 | 10/2013 | Wilkinson | |
| 2016/0145772 A1* | 5/2016 | Yoon | ........................ D01F 9/22 |
| | | | 252/511 |
| 2017/0002482 A1 | 1/2017 | Wilkinson | |

FOREIGN PATENT DOCUMENTS

| | | | | |
|---|---|---|---|---|
| CN | 102277629 A | 12/2011 | | |
| CN | 102336865 A | 2/2012 | | |
| CN | 102733011 A | 10/2012 | | |
| CN | 103193929 A | 7/2013 | | |
| CN | 104231158 A | 12/2014 | | |
| CN | 104558397 A * | 4/2015 | ............... | D01F 6/38 |
| CN | 104611779 A | 5/2015 | | |
| CN | 106012111 B * | 3/2019 | ............... | D01D 5/06 |
| JP | 53-123453 A | 10/1978 | | |
| JP | 55-23588 B2 | 6/1980 | | |
| JP | 11229232 A | 8/1999 | | |
| KR | 1019990035887 A | 5/1999 | | |
| KR | 10-2011-0078306 A | 7/2011 | | |
| KR | 20110078246 A | 7/2011 | | |
| KR | 20120077628 A | 7/2012 | | |
| KR | 20120077785 A | 7/2012 | | |
| KR | 20140074136 A | 6/2014 | | |
| KR | 20150134761 A | 12/2015 | | |

OTHER PUBLICATIONS

Translation of CN 104558397 A (published on Apr. 29, 2015).*
Translation of CN 106012111 B (published on Mar. 26, 2019).*
Abstract of CN 106012111 A (published on Oct. 12, 2016).*

* cited by examiner

*Primary Examiner* — Leo B Tentoni
(74) *Attorney, Agent, or Firm* — Dentons US LLP

(57) ABSTRACT

The present invention relates to a method for producing an acrylonitrile-based fiber, the method including: providing a polymer solution including an acrylonitrile-based copolymer containing a carboxylic acid group; mixing 100 parts by weight of the polymer solution with 1 to 6 parts by weight of a hydrophilization solution containing an organic solvent and ammonia water in a weight ratio of 95:5 to 60:40 to prepare a spinning stock solution; and spinning the spinning stock solution. The method controls the viscosity of the spinning stock solution to improve the stretchability and strength of the acrylonitrile-based fiber, and suppresses the occurrence of gelation.

8 Claims, 1 Drawing Sheet

METHOD FOR PRODUCING ACRYLONITRILE-BASED FIBER

CROSS REFERENCE TO RELATED APPLICATIONS

This application is National Phase Entry pursuant to U.S.C. 371 of International Application No PCT/KR2018/011440 filed Sep. 27, 2018, and claims the benefit of Korean Patent Application No. 10-2017-0127618, filed on Sep. 29, 2017, in the Korean Intellectual Property Office, the disclosure of which is incorporated herein in its entirety by reference.

TECHNICAL FIELD

The present invention relates to a method for producing an acrylonitrile-based fiber using a spinning stock solution subjected to hydrophilization treatment.

BACKGROUND ART

A carbon fiber is a fibrous carbon material having a carbon amount of 90% or more by weight, and indicates a fiber obtained by pyrolyzing a fiber-shaped precursor prepared from polyacrylonitrile (PAN), pitch which is a petroleum-based or coal-based hydrocarbon residue, or rayon in an inert atmosphere.

The carbon fiber is a material having structural and textural characteristics as a carbon material present in constituent elements and also having the fibrous form, and the carbon material has excellent characteristics such as heat resistant, chemical stability, electro-thermal conductivity, dimensional stability due to low thermal expansion, low density, friction wear characteristics, X-ray transparency, electromagnetic wave shielding property, biocompatibility and flexibility, and may also impart very good adsorption characteristics depending on the activation conditions.

Meanwhile, the acrylonitrile-based copolymer is widely being used as a raw material of a carbon fiber precursor. Generally, the acrylonitrile-based copolymer is dissolved in an organic solvent or an inorganic solvent to prepare a spinning stock solution, followed by wet spinning, dry spinning or wet-dry spinning to be produced in the fibrous form, and followed by coagulation, washing, stretching and drying to be capable of obtaining an acrylonitrile-based fiber.

In order to secure stability by accelerating flame retardation treatment of a precursor fiber in the production of a flame-resistant fiber using the acrylonitrile-based copolymer, a method for preparing an acrylonitrile-based copolymer by copolymerizing a small amount of monomers containing a carboxylic acid group together with acrylonitrile is widely used. In the wet or wet-dry spinning using the spinning stock solution prepared with the acrylonitrile-based copolymer prepared thus, in order to increase the hydrophilicity of the spinning stock solution and suppress micro or macro voids, there is proposed a method for ionizing the above-described carboxylic acid group using ammonia water. However, the ammonia water introduced in order to ionize the carboxylic acid group is easy to generate a gel polymer in the spinning stock solution, and such a gel polymer acts as a foreign matter in the spinning process of the spinning stock solution containing the acrylonitrile-based fiber, so that the production stability and the operability may be deteriorated.

PRIOR ART DOCUMENT

Patent Document (Patent Document 1) KR1999-0035887A

DISCLOSURE OF THE INVENTION

Technical Problem

An aspect of the present invention provides a method for producing an acrylonitrile-based fiber that can improve productivity, stability and operability.

Technical Solution

According to an aspect of the present invention, there is provided a method for producing an acrylonitrile-based fiber, the method including: providing a polymer solution including an acrylonitrile-based copolymer containing a carboxylic acid group; mixing 100 parts by weight of the polymer solution with 1 to 6 parts by weight of a hydrophilization solution containing an organic solvent and ammonia water in a weight ratio of 95:5 to 60:40 to prepare a spinning stock solution; and spinning the spinning stock solution.

Advantageous Effects

A method for producing an acrylonitrile-based fiber according to the present invention may utilize ammonia water under specific conditions in the process of hydrophilizing an acrylonitrile-based copolymer, thereby suppressing the generation of gel polymers to be generated, controlling viscosity through the hydrophilization treatment, and thus improving the stretchability and strength of spinning fibers and easily performing the spinning, so that the productivity, stability and operability of the acrylonitrile-based fiber may be improved.

MODE FOR CARRYING OUT THE INVENTION

Figure 1:
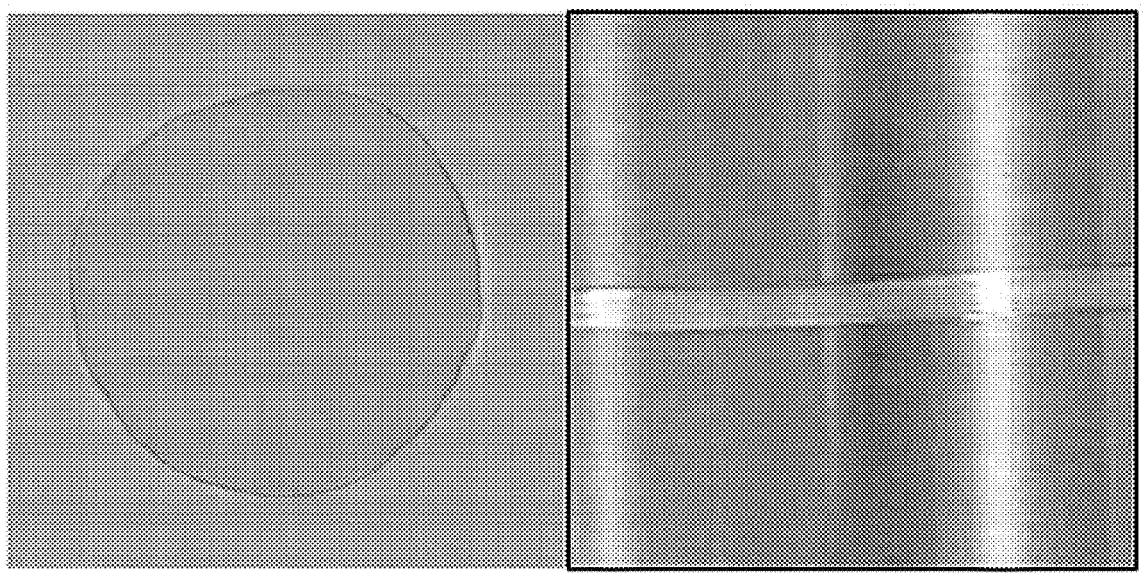
FIG. 1 is a photograph showing the circularity and transparency of an acrylonitrile-based fiber of Example 4.

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

An acrylonitrile-based fiber according to an embodiment of the present invention may include step 1 of providing a polymer solution including an acrylonitrile-based copolymer containing a carboxylic acid group.

In order to promote and stabilize flame retardation, the acrylonitrile-based copolymer may be prepared by polymerizing 90 to 99.9 parts by weight of an acrylonitrile-based monomer and 0.1 to 10 parts by weight of a carboxylic acid-based monomer, based on 100 parts by weight of the monomer used in the preparation of the acrylonitrile-based copolymer.

The carboxylic acid-based monomer is particularly limited, but may be one or more selected from the group consisting of an itaconic acid, an acrylic acid and a methacrylic acid, and may be specifically an itaconic acid.

The acrylonitrile-based copolymer may be prepared by further polymerizing a (meth)acrylate monomer, and may be polymerized by adding the (meth)acrylate monomer in an amount of 0.1 to 6 parts by weight based on 100 parts by weight of the monomer mixture. The (meth)acrylate monomer is not particularly limited, but may be one or more selected from the group consisting of methyl acrylate, ethyl acrylate, propyl acrylate, methyl methacrylate, ethyl methacrylate and propyl methacrylate, and may be specifically methyl acrylate.

As the polymerization method of the acrylonitrile-based copolymer, known polymerization methods such as solution polymerization, suspension polymerization and emulsion polymerization may be used, and the solution polymerization is preferable in consideration of process convenience. Examples of the solvent used in the solution polymerization include dimethyl sulfoxide, dimethyl formamide, dimethyl acetamide or the like. In consideration of the productivity, that is, the coagulation rate, the solvent may be dimethyl sulfoxide.

The acrylonitrile-based copolymer may be an acrylonitrile-based copolymer to which a polymerization conversion rate of 97% or more is applied. As described later, though the polymerization conversion rate might not be greatly increased due to the viscosity of the spinning stock solution which had a limited value in the past, when the producing method such as the hydrophilization treatment according to the present invention is applied, the spinning may be smoothly performed even when the polymerization conversion rate is increased to 97% or more, so that a high quality carbon fiber may be provided.

The solvent contained in the polymer solution is not particularly limited, but the solvent available for the solution polymerization is preferably used.

The pH of the polymer solution may be 4 to 8, specifically 5 to 7. The amount of the carboxylic acid group in the acrylonitrile-based copolymer contained in the polymer solution at the above-mentioned pH may be deduced.

In addition, since the polymer solution is prepared through the solution polymerization, the state in which the polymerization is completed may be a state in which a copolymer is contained in an organic solvent. In this case, the concentration of the copolymer in the polymer solution may be preferably 15 to 25 wt %, and more preferably 18 to 22 wt %. That is, the polymerization may be completed in a state in which the copolymer is diluted with the organic solvent.

The method for producing an acrylonitrile-based fiber according to an embodiment of the present invention may include step 2 of mixing 100 parts by weight of the polymer solution with 1 to 6 parts by weight of a hydrophilization solution containing an organic solvent and ammonia water in a weight ratio of 95:5 to 60:40 to prepare a spinning stock solution.

The ammonia ($NH_3$) in the ammonia water serves to improve hydrophilicity by ionizing the carboxylic acid group included in the acrylonitrile-based copolymer. The equivalence ratio of the ammonia ($NH_3$) in the ammonia water to the carboxylic acid group for the hydrophilization treatment may be preferably 2:1 to 1.5:1, specifically 1.3:1 to 0.9:1. When the above-mentioned range is satisfied, there is an advantage that gelation of the spinning stock solution may be suppressed and hydrophilicity may be improved.

Such hydrophilization may improve the circularity of and compactness of a spinning fiber, and the strength and stretchability of the carbon fiber produced finally may be improved because of such effects.

More specifically, when the acrylonitrile-based copolymer is not subjected to the hydrophilization treatment, the solvent in the polymer, that is, the solvent used in polymerization, diffuses into the water, which is outside the polymer, in a coagulation process by water during spinning. In addition, the outer surface of the polymer (spinning fiber) is hydrophobic, so that the water in the coagulation process may irregularly approach and penetrate into the spinning fiber. Accordingly, the cross-section of the spinning fiber which is the acrylonitrile-based copolymer may not maintain the original shape thereof, which may adversely affect the quality of the carbon fiber.

However, in the hydrophilization treatment according to the present invention, the solvent inside the polymer is suppressed from being diffused toward the outside by the functional groups or the ions hydrophilized in the outside of the spinning fiber, so that the circularity of the spinning fiber may be maintained.

On the other hand, the water included in the ammonia water for hydrophilization treatment reacts with the acrylonitrile-based copolymer to form a gel polymer, and the formed gel polymer may act as a foreign matter in a spinning process to be described later, so that the production stability and operability of the acrylonitrile-based fiber may be deteriorated.

When an ammonia gas not containing water is used for solving this problem, the ammonia gas is introduced into the polymer solution with a separate device in order to contact the polymer solution in an ammonia gas state in which ammonia is not dissolved in the ammonia water, so that the process may become complicated and facilities may be added to thus raise overall process costs, operating costs and the like, which in turn may have a fatal effect on the price competitiveness of the final carbon fiber.

Thus, since the direct use of the ammonia gas may cause problems in various aspects, it is preferable to use ammonia water. The water in the ammonia water is preferably included in a small amount that the carboxylic acid group of the acrylonitrile-based copolymer in the polymer solution may come into contact with and react with the ammonia.

As described above, in order to eliminate the problem caused due to water while applying the ammonia water without using the ammonia gas, the weight ratio of the organic solvent to the ammonia water may be preferably 95:5 to 60:40, and more preferably 93:7 to 70:30. When the above-mentioned range is satisfied, there are advantages that the gelation caused by water in the ammonia water may be prevented and the spinning operability may be improved.

In other words, when the polymer solution is subjected to the hydrophilization treatment, the above-described effect may be obtained by diluting the ammonia water with the organic solvent. When the ammonia water is directly added to the polymer solution having a concentration of about 15 to 25% by weight without dilution, as described above, there is a high possibility that production stability and operability are lowered due to the formation of the gel polymer.

Therefore, even when the organic solvent is included in the polymer solution, it may be necessary to dilute the ammonia water with the organic solvent in an allowable amount during the adding of the ammonia water. In this case, the dilution ratio may be preferably 95:5 to 60:40, and more preferably 93:7 to 70:30.

On the other hand, the amount of the hydrophilization solution added to the polymer solution may be 1 to 6 parts by weight based on 100 parts by weight of the polymer solution, and may be controlled depending on a ratio between the organic solvent and the ammonia water to some extent. However, aside from this consideration, it may be preferable to satisfy the above amount range for the prevention of gel polymer formation. When the hydrophilization solution is contained in an amount lower than 1 part by weight, the viscosity may be too high; when the amount is higher than 6 parts by weight, the viscosity may be too low. Therefore, it may be preferable to satisfy the above range.

The organic solvent is not particularly limited, but it is preferable to use a solvent capable of being contained in the polymer solution.

As described above, by appropriately controlling the weight ratio between the ammonia water and the organic solvent, it is possible to solve all the problems during the introduction of the gas or the aqueous solution at the time of the ammonia treatment required for the hydrophilization of the acrylonitrile-based copolymer.

On the other hand, the viscosity of the spinning stock solution needs to be appropriately controlled for preventing the clogging phenomenon of the discharge port of the spinning device, the uniform compactness of the entire fiber, and the like. Conventionally, in order to control the viscosity of the spinning stock solution, a process of adding a solvent separately, or a process of adjusting the viscosity of the polymer solution by lowering the polymerization conversion rate in the preparation of the acrylonitrile-based copolymer, or the like has been carried out.

However, processing such as the preparation of the acrylonitrile-based copolymer by increasing the polymerization conversion rate and the introduction of the solvent for reducing the viscosity alone is not an appropriate method for the overall operation of the process. Therefore, it is general to apply a method for lowering the polymerization conversion rate.

However, in the case of performing the hydrophilization treatment according to the present invention, the effect of the hydrophilization treatment and the effect of diluting the polymer solution may be achieved at the same time, so that the polymerization conversion rate of the acrylonitrile-based copolymer may be greatly increased, thereby being capable of preparing a copolymer having a large molecular weight. As a result, there may be provided a spinning stock solution which has an advantage of improving physical properties of the carbon fiber and also has the viscosity controlled so as not to cause problems in the spinning process.

As described above, the ultimate viscosity of the spinning stock solution with a controlled viscosity may be 1 or more and less than 2, specifically 1.3 to 1.7. The ultimate viscosity of the spinning stock solution may be achieved by controlling the mixing ratio between the polymer solution and the hydrophilization solution. When the above-mentioned range is satisfied, the spinning may be easily performed without clogging the discharge port of the spinneret in the spinning process described later, so that the productivity, stability and operability of the acrylonitrile-based fiber may be improved.

The ultimate viscosity is a value obtained by calculating the ultimate viscosity $[\eta]$ of a PAN solution by applying Equation 1 below, which is an extended relational expression of Huggins Equation, and when the $[\eta]$ of the HOMO PAN is Ref, the fitting parameters ($K_H$, $B_n$, and n) of the relational expression are calculated.

$$\eta_{sp}-[\eta]-c \quad \text{[Equation 1]}$$

wherein $\eta_{sp}=c[\eta]+K_H([\eta])^2+B_n(c[\eta])^n$, $-K_H=0.367$, $-B_n=0.0156$.

In addition, $[\eta]$ having the smallest total error may be calculated by using $\eta_{sp}$, $K_H$, $B_n$, and n calculated from the viscosity measurement results of the PAN solutions at the four concentrations (0.5 to 5 wt %) total.

In addition, the spinning stock solution having the controlled viscosity may have a viscosity between a range of 400 to 650 P, and such a viscosity may be obtained through the hydrophilization treatment. In the case where the spinning stock solution in which the formation of the gel polymer is prevented has a viscosity within the above range, the productivity may be improved in the spinning process, and the spinning process may be performed continuously and stably.

Here, the viscosity is a viscosity measured by using a Brookfield viscometer having a cone type spindle (CPA-52Z), which has a cone angle of 3°, a cone radius of 1.2 cm and a gap of 13 or less, and is a viscosity measured by setting the measured shear rate and temperature to 10-20/sec and −45° C., respectively.

The pH of the spinning stock solution may be 9 to 11, specifically 10 to 11, and preferably 10.4 or higher. The above-mentioned pH may indicate that the hydrophilicity of the acrylonitrile-based copolymer contained in the spinning stock solution is improved, and the pH may be higher depending on the degree of hydrophilization.

The method for producing an acrylonitrile-based fiber according to an embodiment of the present invention may include step 3 of spinning the spinning stock solution.

The spinning may be carried out in a wet, dry or dry-wet method, specifically, a wet or dry-wet method. In addition, the spinning may be specifically carried out so as to include one cycle of a coagulation process, a washing process and a stretching process one times or more. More specifically, since the number of times of the coagulation process, the washing process, and the stretching process affects on the structure, tensile property and densification property of the acrylonitrile-based fiber, the total number of times of execution thereof is properly adjustable and may be 3 to 20 times.

The spinning may be performed by using a spinneret. The shape, diameter and number of the discharge port in the spinneret may be adjusted so as to be adapted to the carbon fiber as the final product. The material constituting the spinneret is not particularly limited, but examples thereof include stainless steel, gold, and platinum.

The spinning stock solution may be discharged from the inside of the coagulation solution through the spinneret and then coagulated during the coagulation process to produce a coagulated yarn. Further, the spinning stock solution may be discharged through the spinneret, move a certain distance in the air, and then be coagulated in the coagulation solution to produce the coagulated yarn.

The discharge amount and the discharge speed of the spinning stock solution may be adjusted depending on the concentration of the spinning stock solution.

Specifically, when the diameter of the discharge port in the spinneret is 0.07 mm and the number of the discharge ports is 100, the discharge amount may be 1-10 cc/min and the discharge speed may be 0.3-4 m/min, specifically 0.5-2 m/min when considering the stability. Specifically, when the solvent contained in the spinning stock solution is dimethyl sulfoxide, the temperature at the time of discharging may be 40-60° C. When the above-mentioned temperature range is satisfied, the fluidity and ultimate viscosity of the spinning stock solution may be properly maintained. When the temperature is lower than the above-mentioned range, the fluidity of the spinning stock solution is deteriorated and the ultimate viscosity of the spinning stock solution is increased, so that the spinning may not be performed smoothly. In addition, when the temperature at the time of discharging is lower than 19° C., the dimethyl sulfoxide freezes and may be not discharged. When the above temperature is exceeded, the spinning stock solution may be discolored.

The temperature of the coagulation solution may be determined in consideration of the coagulation point and boiling point of the coagulation solution, the compactness of the acrylonitrile-based fiber, and the balance of the strength of the carbon fiber as the final product. Specifically, the temperature of the coagulation solution may be 40-60° C. More specifically, the temperature of the coagulation solution may be the same as that of the spinning stock solution. This is because a high-quality acrylonitrile-based fiber is produced only when the temperature and the viscosity are kept constant or the temperature and viscosity gradients are minimized in the entire process until the spinning stock solution becomes a fiber. When the temperature of the coagulating solution is lower than that of the spinning stock solution, the solvent diffusion rate between the coagulated yarn and the coagulation solution slows, which may help to densify the structure of the coagulated yarn. However, the fluidity may be lowered, the fiberization may not be easy, and the spinneret may be clogged during discharge. When the temperature exceeds 60° C., the solvent diffusion between the coagulated yarn and the coagulation solution proceeds very quickly, and thus the structure densification of the coagulated yarn may not be performed properly. When the structure densification is not performed properly, many pores are formed on the surface of or inside the coagulated yarn, and the density of the acrylonitrile-based fiber, i.e., the final product of the present invention may be reduced.

The coagulation solution is not particularly limited as long as it may coagulate the discharged spinning stock solution. The coagulation solution may be a mixed solution of water and an organic solvent. The reason is that the water may solidify the acrylonitrile-based copolymer or may form the acrylonitrile-based copolymer into a fiber form and the organic solvent may dissolve the acrylonitrile-based copolymer. When the coagulation solution is composed of 100% water, the acrylonitrile-based copolymer is solidified as soon as it passes through the spinneret, so that the fiberization may not be performed and also the discharge port of the spinneret may be clogged. Accordingly, when the water and the organic solvent are appropriately mixed with the above coagulation solution, the disadvantage exhibited by water may be offset.

The washing may be performed for removing impurities, reagents or dispersion media remaining in the coagulated yarn.

The washed coagulated yarn may be stretched in order to promote the densification of the acrylonitrile-based fiber, thereby forming a stretched yarn. The stretching magnification may be increased by 1.5-10 times, particularly 2-6 times with respect to the whole length of the washed coagulated yarn.

The stretching process may be performed using a roller. In addition, the stretching process may be performed once or twice or more, and is preferably performed twice or more in order to improve the strength of the carbon fiber as the final product. It is preferable that the difference between stretching temperatures at the time of performing the stretching two or more times be 10-20° C.

The stretching process may be performed at 60-100° C., specifically 70-100° C., more specifically 80-100° C.

The acrylonitrile-based fiber produced by the method for producing an acrylonitrile-based fiber according to an embodiment of the present invention may be formed from a carbon fiber precursor by performing flame retardation treatment.

In the present invention, the flame retardation may have substantially the same meaning as the term 'flame proofing' and may be used including the meaning of 'flame retardation treatment'. Specifically, the flame retardation may mean a generic term that is difficult to continue burning, that is, it is difficult to burn.

Further, in the present invention, the flame retardation may be performed such that it not only imparts flame retardation properties to the acrylonitrile-based fiber, but also has the property in which the acrylonitrile-based fiber subjected to flame retardation treatment, that is, the carbon fiber precursor, easily controls the carbonization reaction.

On the other hand, the flame retardation is carried out by heat treatment while applying a certain tension in an oxidizing or air atmosphere, and may be performed in order to convert the acrylonitrile-based copolymer in the acrylonitrile-based fiber into a ladder polymer by a cyclization reaction and convert the acrylonitrile-based copolymer into a polymer having aromatic rings by oxidation and dehydrogenation reactions.

Due to the flame retardation, among the components constituting the acrylonitrile-based fiber, low molecular weight materials are removed, and the chemical structure of the acrylonitrile-based fiber is greatly changed.

During the flame retardation is performed, the acrylonitrile-based fiber finally turns black through yellow and brown. When the holding time in a flame-resistant heat treatment zone is too long, the acrylonitrile-based fiber may burn due to peroxidation. In addition, since the exothermic reaction by the cyclization reaction, the oxidation reaction and the dehydrogenation reaction occurring during the flame retardation is performed suddenly for a short time, it is difficult to control the reaction, and such an exothermic reaction may break the chains of the acrylonitrile-based fiber, and as a result, the physical properties of the carbon fiber may be deteriorated.

Therefore, controlling the flame retardation may be an important factor in a method for preparing a carbon fiber precursor.

The flame retardation may be performed at 200-350° C. while applying a certain tension in an oxidizing or air atmosphere. Specifically, during the flame retardation, it may be appropriate that the reaction is performed at a temperature lower by 10-20° C. than the temperature at which the yarn is broken due to reaction heat in consideration of the productivity.

The specific gravity of the carbon fiber precursor subjected to the flame retardation may be 1.2-1.5, specifically 1.3-1.4.

The carbon fiber precursor may be formed from a carbon fiber by carbonization.

When the carbonization is carried out, hetero atoms such as N and the like in the carbon fiber precursor may be removed, thereby producing a carbon fiber having a carbon amount of 90% or more and having a structure similar to graphite.

The carbonization may be a process for heating the flame-resistant fiber at 1,000-3,000° C. in an inert atmosphere. The carbonization may control the temperature according to the characteristics of the carbon fiber to be obtained. In order to obtain a carbon fiber having high strength, the carbonization may be performed at 2,000-3,000° C.

The carbon fiber may contain carbon in an amount of 92 to 98% and may contain nitrogen as a second component. The carbon fiber may contain moisture in an amount of 0.05% or less, be stable without being affected by moisture, and exhibit water resistance higher than that of glass fibers or aramid fibers. In addition, the carbon fiber may have excellent chemical resistance, and may have a tensile strength of 3,500 MPa or more and a tensile elastic modulus of 230 GPa or more.

The carbon fiber may be used as a material for aerospace, sporting goods, and construction and civil engineering.

EXAMPLE

Hereinafter, examples of the present invention will be described in detail so that those skilled in the art may easily carry out the present invention. The present invention may, however, be embodied in many different forms and should not be construed as limited to the embodiments set forth herein.

Preparation Example 1: Preparation of Acrylonitrile-Based Copolymer

Azobisisobutyronitrile (AIBN) serving as an initiator was added to a composition for forming an acrylonitrile-based copolymer, which contains 92 parts by weight of acrylonitrile, 6 parts by weight of methyl acrylate, and 2 parts by weight of an itaconic acid, and then solution polymerization was carried out at a temperature of 70° C. for 14 hours, and the polymerization was terminated at a proper polymerization conversion rate to prepare a polymer solution containing the acrylonitrile-based copolymer. In this case, the concentration of the polymer solution was about 21 wt %.

Examples 1 to 4 and Comparative Examples 1 to 4

The polymer solution prepared in Preparation Example 1 was mixed in the ratios shown in Table 1 below with ammonia water, which contains ammonia ($NH_3$) in equivalent ratios shown in Table 1 below with respect to the carboxylic acid (COOH) of the acrylonitrile-based copolymer in the polymer solution, and dimethyl sulfoxide (DMSO) to prepare hydrophilization solutions.

The polymer solution and the hydrophilization solutions were mixed in the ratios shown in Table 1 below to prepare spinning stock solutions of Examples 1 to 4 and Comparative Examples 1 to 4.

TABLE 1

| Classification | Example | | | | Comparative Example | | | |
| --- | --- | --- | --- | --- | --- | --- | --- | --- |
|  | 1 | 2 | 3 | 4 | 1 | 2 | 3 | 4 |
| Equivalent ratio COOH to $NH_3$ | 1:1.2 | 1:1.5 | 1:1.5 | 1:1.5 | 1:1.5 | 1:1.5 | 1:0 | 1:1.5 |
| DMSO:Ammonia water (weight ratio) | 91.5:8.5 | 93:7 | 88:12 | 70:30 | 97:3 | 55:45 | 100:0 | 0:100 |
| Hydrophilization solution (parts by weight) | 4.17 | 5.26 | 3.09 | 1.01 | 8.89 | 0.64 | 10 | 0.3 |
| Hydrophilization temperature (° C.) | 65 | 60 | 60 | 60 | 60 | 60 | 60 | 60 |
| Hydrophilization time (hr) | 1.0 | 1.0 | 1.0 | 2.0 | 1.0 | 1.0 | 1.0 | 1.0 |

Experimental Example 1: Evaluation of Characteristics of Spinning Stock Solutions The spinning stock solutions prepared in Examples 1 to 4 and Comparative Examples 1 to 4 were evaluated according to the following conditions, and the results are shown in Table 2 below.

<Measurement Conditions>

1) Viscosity of the Spinning Stock Solution:

The viscosity was measured by using a Brookfield viscometer having a cone type spindle (CPA-52Z), which has a cone angle of 3°, a cone radius of 1.2 cm and a gap of 13 or less, and was measured by setting the measured shear rate and temperature to 10-20/sec and −45° C., respectively.

2) pH of the Spinning Liquid:

The pH sensor was inserted directly into the polymer solution and stabilized for 15 minutes, and then the pHs of the stock solutions were measured.

3) Confirmation of Gelation:

An ammonia organic solvent-mixed solution was added dropwise while stirring 100 ml of the polymer solution at 60° C. to react the polymer solution and the ammonia-mixed solution. A PAN-mixed solution was stirred for 1 hour, and after 12 hours, the surface of the solution was observed to confirm the gelation.

TABLE 2

| Classification | Example 1 | Example 2 | Example 3 | Example 4 | Comparative Example 1 | Comparative Example 2 | Comparative Example 3 | Comparative Example 4 |
|---|---|---|---|---|---|---|---|---|
| Organic solvent:Ammonia water (weight ratio) | 91.5:8.5 | 93:7 | 88:12 | 70:30 | 97:3 | 55:45 | 100:0 | 0:100 |
| Spinning stock solution viscosity (P) | 625.0 | 616.4 | 589.0 | 460.0 | 305 | 710 | 350 | 820 |
| The pH of the spinning stock solution | 10.4 | 10.6 | 10.3 | 10.6 | 10.2 | 10.3 | 8.2 | 10.2 |
| Whether it gels or not | X | X | X | X | X | ○ | X | ○ |

Referring to Table 2, in the case of Examples 1 to 4 in which the weight ratios of the organic solvents to the ammonia water were adjusted to 95:5 to 60:40 and the hydrophilization solution was applied in a range of 1 to 6 parts by weight, it may be ascertained that the desired level of viscosity may be between 450 and 650 P.

Specifically, it may be ascertained from Example 4 and Comparative Example 2 that although the amounts of the hydrophilization solutions were not greatly different, the difference in viscosity therebetween was considerably large. It may be inferred that when the viscosity exceeded 650 P, the spinning device may have a higher possibility to be adversely affected and the stretchability of the fiber may be deteriorated. Also, it may be ascertained from Comparative Example 1 that the viscosity was greatly reduced by adding an excess amount of the hydrophilization solution in a state where the ratio between the organic solvent and the aqueous ammonia was not adjusted. As a result, it may be inferred that physical properties of the spinning fiber, in particular in terms of strength, may be deteriorated.

Furthermore, in the case of Comparative Example 3 in which only the organic solvent was added without adding ammonia water, it may be ascertained that the hydrophilization treatment was not carried out at all in view of a low pH. As a result, it may be seen that the viscosity was extremely low to adversely affect the strength of the fiber. In addition, in the case of Comparative Example 4 in which only ammonia water was added, it may be deduced that the hydrophilization treatment was carried out in view of the pH. However, it may be predicted that the viscosity will be excessively increased to adversely affect the spinning device and the stretchability of the fiber.

In addition, in the case of the case of Comparative Examples 2 and 4, it may be ascertained that the ammonia water was not diluted or the dilution concentration was not adjusted at a certain ratio, resulting in high viscosity and gelation. That is, it may be inferred that when the ammonia water is not diluted and added, the stretchability and transparency of the spinning fiber may be adversely affected due to viscosity increase and gelation.

Experimental Example 2: Evaluation of Characteristics of Acrylonitrile-Based Fiber after Spinning The spinning stock solutions of Example 4 and Comparative Example 3 were coagulated by discharging water and dimethyl sulfoxide into the coagulation solution (temperature: 50° C.) contained in a weight ratio of 45:55 in a coagulation bath by using a spinneret (discharge port diameter: 100 μm, discharge port number: 100) to prepare a coagulated yarn. On the other hand, the spinneret was located in the coagulation solution. The coagulated yarn was moved from the coagulation bath to a washing bath through a roller, washed in the washing bath containing water (60° C.), and stretched at 95° C. by using the roller to produce acrylonitrile-type fibers.

Figure 2:
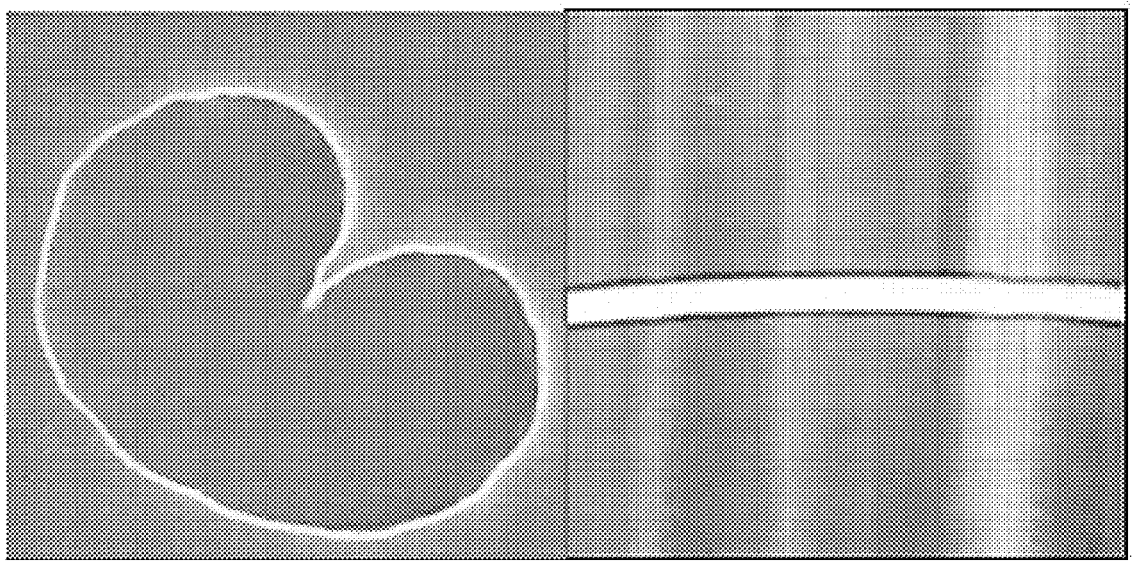
FIG. 2 is a photograph showing the circularity and transparency of an acrylonitrile-based fiber of Comparative Example 3.

The circularity, the transparency, the density, the number of voids, and the maximum stretching ratio of the acrylonitrile-based fibers produced in Example 4 and Comparative Example 3 were measured under the following conditions, and the results are shown in FIGS. 1 and 2 and Table 3.

<Evaluation Method>
1) Method of Measuring Circularity:

The cross-sections of the acrylonitrile-based fibers were measured with a SEM instrument (FESEM, S-4800, Hitachi) at a magnification of 2.0 k, and then the ratio of the long axis to the short minor axis of the cross-section (long axis/short axis) was measured.

2) Transparency:

The acrylonitrile-based fibers were visually observed.

3) Density:

A swollen yarn sample having passed through a hot water stretching bath was dehydrated at 3000 rpm for 15 minutes using a centrifugal dehydrator, and then dried in an oven at 105° C. for 1 hour to measure density thereof (Sartorius, QUINTIX224-1SKR), and for a certain amount of fiber bundles, the weight in air and the weight in ethanol were measured, and then the density was calculated using Equation 1 below.

$$\rho = [Wa/(Wa-Wl)] \times \rho l \quad \text{[Equation 1]}$$

wherein $\rho$ is density, $\rho l$ is liquid density, $Wa$ is weight in air, and $Wl$ is weight in liquid.

4) Pore Number:

The porosity was relatively compared based on the density of the swollen yarn having passed through the hot water stretching bath.

5) Maximum Stretching Ratio:

The maximum stretching ratio was calculated from the following equation by measuring the roller speed when the fiber was discharged to the outside of the spinning device after the fiber was stretched, and the speed of the roller between the coagulation bath and the water bath.

(Maximum elongation ratio)=(roller speed when discharged to the outside of the spinning device after stretching)/(roller speed between the coagulation bath and the water bath)

6) Strength, Elastic Modulus, Elongation and Fineness:

The strength, elastic modulus, elongation and fineness of the fiber were measured using a FAVIMAT facility according to ISO 11566:1996, which is the measurement standard for short fiber physical properties. The strength, elastic modulus and elongation were measured at a pretension of 1 cN/tex and a test speed of 2.0 mm/min, and the fineness was measured at a pretension of 1 cN/tex and a test speed of 0.5 mm/min.

7) Orientation:

The orientation was measured using the Powder X-ray Diffractometer (D4 enveador XRD 1, 2, 3).

TABLE 3

| Classification | | Example 4 | Comparative Example 3 |
|---|---|---|---|
| Circularity | Circularity | 1.04 | 1.42 |
| | Long axis (μm) | 26.6 | 38.5 |
| | Short axis (μm) | 25.6 | 27.1 |
| Transparency | | Transparency | Opacity |
| Density(g/cm³) | | 1.13 | 1.09 |
| Number of voids | | Many | Small |
| Maximum stretching ratio | Maximum stretching ratio | 11 | 7 |
| | The roller speed (m/sec) when discharged to the outside of the spinning device after stretching | 11 | 7 |
| | The roller speed (m/sec) between the coagulation bath and the water bath | 1 | 1 |

TABLE 4

| | strength (g/d) | Elastic modulus (g/d) | Elongation (%) | Fineness (denier) | Orientation |
|---|---|---|---|---|---|
| Example 4 | 7.1 | 129 | 12.5 | 1.00 | 0.86 |
| Comparative Example 3 | 6.0 | 125 | 12.1 | 1.01 | 0.85 |

Referring to Table 3, it may be seen that the acrylonitrile-based fiber of Example 4 according to the present invention has low circularity, transparency, small number of voids, high density, and excellent stretchability. However, it may be ascertained that the acrylonitrile-based fiber of Comparative Example 3 has a high degree of circularity, is opaque, has a low density, and is not excellent in stretchability.

In addition, in the case of FIG. 1 showing the fiber of Example 4, it may be ascertained that the cross-section of the fiber has a shape almost close to a circle, and it may be also ascertained with the naked eye that the fiber is transparent. However, in the case of FIG. 2 showing the fiber of Comparative Example 3, it may be ascertained with the naked eye that the cross-section of the fiber is close to a "heart" shape, and the fiber itself is considerably opaque.

Furthermore, referring to Table 4, it may be seen that the acrylonitrile-based fiber of Example 4 is excellent in all physical properties in comparison with the fiber of Comparative Example 3, and in particular, the strength is improved by about 20%.

From the above, when a hydrophilization solution mixed with ammonia water and an organic solvent at an appropriate ratio is added to a spinning stock solution to perform hydrophilization treatment, it may be seen that the improvement of the stretchability of the fiber, the improvement of the circularity, and the improvement of the number of voids and transparency inside the fiber may be achieved.

The invention claimed is:

1. A method for producing an acrylonitrile-based fiber, the method comprising:
   preparing a polymer solution comprising an acrylonitrile-based copolymer containing a carboxylic acid group, wherein the concentration of the acrylonitrile-based copolymer in the polymer solution is 15 to 25 wt % based on a total weight of the polymer solution;
   mixing 100 parts by weight of the polymer solution with 1 to 6 parts by weight of a hydrophilization solution comprising an organic solvent and ammonia water in a weight ratio of 95:5 to 60:40 to prepare a spinning stock solution, wherein the hydrophilization solution comprises the organic solvent and the ammonia water in a weight ratio of 93:7 to 70:30; and
   spinning the spinning stock solution to produce the acrylonitrile-based fiber.

2. The method of claim 1, wherein the equivalent ratio of ammonia ($NH_3$) in the ammonia water to the carboxylic acid group is 2:1 to 1.5:1.

3. The method of claim 1, wherein the acrylonitrile-based copolymer is prepared by polymerizing a monomer mixture comprising:
   90 to 99.9 parts by weight of an acrylonitrile-based monomer; and
   0.1 to 10 parts by weight of a carboxylic acid-based monomer.

4. The method of claim 3, wherein the carboxylic acid-based monomer is one or more selected from the group consisting of an itaconic acid, an acrylic acid and a methacrylic acid.

5. A method for producing a carbon fiber, the method comprising:
   producing an acrylonitrile-based fiber according to claim 1;
   subjecting the acrylonitrile-based fiber to flame retardation treatment; and
   carbonizing the acrylonitrile-based fiber subjected to the flame retardation treatment.

6. The method of claim 1, wherein the spinning comprises at least one cycle of a coagulation process, a washing process and a stretching process.

7. The method of claim 6, wherein a total number of cycles thereof is 3 to 20 times.

8. The method of claim 1, wherein the organic solvent is dimethyl sulfoxide.

* * * * *